United States Patent
Kiner et al.

(10) Patent No.: US 10,407,254 B2
(45) Date of Patent: Sep. 10, 2019

(54) PELLETIZED FEED DISTRIBUTOR

(71) Applicant: Harper Industries, Inc., Harper, KS (US)

(72) Inventors: Mark Kiner, Perry, OK (US); Ross Milton Bender, Conway Springs, KS (US); Mark R. Pulliam, Harper, KS (US)

(73) Assignee: Harper Industries, Inc., Harper, KS (US)

( * ) Notice: Subject to any disclaimer, the term of this patent is extended or adjusted under 35 U.S.C. 154(b) by 241 days.

(21) Appl. No.: 15/486,070

(22) Filed: Apr. 12, 2017

(65) Prior Publication Data

US 2017/0297829 A1    Oct. 19, 2017

Related U.S. Application Data (60) Provisional application No. 62/324,102, filed on Apr. 18, 2016.

(51) Int. Cl.
| | |
|---|---|
| *B65G 47/82* | (2006.01) |
| *B65G 11/12* | (2006.01) |
| *B65G 33/18* | (2006.01) |
| *B65G 47/18* | (2006.01) |
| *B65G 65/46* | (2006.01) |

(52) U.S. Cl.
CPC ............ *B65G 47/82* (2013.01); *B65G 11/126* (2013.01); *B65G 33/18* (2013.01); *B65G 47/18* (2013.01); *B65G 65/46* (2013.01)

(58) Field of Classification Search
CPC ...... B65G 47/82; B65G 11/126; B65G 33/18; B65G 47/18; B65G 65/46
See application file for complete search history.

(56) References Cited

U.S. PATENT DOCUMENTS

| | | | |
|---|---|---|---|
| 2,290,460 A | 7/1942 | Winsor | |
| 2,661,876 A | 12/1953 | Kindseth | |
| 3,206,215 A | 9/1965 | Jong | |
| 4,155,466 A * | 5/1979 | Hogenesch | A01K 43/00 414/21 |
| 4,359,175 A * | 11/1982 | Lizenby | B65G 47/18 222/199 |
| 4,488,664 A | 12/1984 | Cleland | |
| 4,801,085 A | 1/1989 | Fischer | |
| 5,368,236 A | 11/1994 | Meyer et al. | |
| 5,386,943 A | 2/1995 | Peeters | |
| 5,653,567 A | 8/1997 | Taylor | |
| 6,881,022 B2 | 4/2005 | Feller | |
| 7,832,598 B2 | 11/2010 | Rode et al. | |
| 8,265,837 B2 | 9/2012 | Ricketts et al. | |
| 8,366,372 B2 | 2/2013 | Yoder et al. | |
| 2012/0275889 A1* | 11/2012 | Hoppel | B65G 47/18 414/528 |
| 2016/0355329 A1* | 12/2016 | Elliott | B65G 11/206 |
| 2016/0376107 A1* | 12/2016 | Beaujot | G01G 19/12 177/1 |

* cited by examiner

*Primary Examiner* — Saul Rodriguez
*Assistant Examiner* — Ashley K Romano
(74) *Attorney, Agent, or Firm* — Erickson Kernell IP, LLC; Kent R. Erickson (57) ABSTRACT

A pelletized feed distributor includes a hopper having an auger positioned at the bottom thereof for moving feed in the hopper toward a discharge opening. A discharge door selectively closes the discharge opening. A door linkage connected between the auger and the discharge door cyclically opens and closes the door.

27 Claims, 12 Drawing Sheets

PELLETIZED FEED DISTRIBUTOR

CROSS-REFERENCE TO RELATED APPLICATIONS

This application claims the benefit of U.S. Provisional Patent Application No. 62/324,102 filed Apr. 18, 2016, the disclosure of which is hereby incorporated herein in its entirety by reference.

BACKGROUND OF THE INVENTION

Field of the Invention

This invention relates to the feeding of livestock, and in particular to a device for distributing pelletized feed.

Description of the Related Art

Cattle and other livestock are often left to gaze in a pasture and receive the majority of their nutritional requirements from the grass that they consume. In winter, or at other times when grass is not growing at a sufficient rate to sustain the livestock (such as periods of drought), hay may be fed in addition to pasture grass. In any season, however, a herdsman may decide to supplement the grass and/or hay with another type of feed. One common type of feed used as a supplement is a pelletized fee often referred to as "range cubes," "cattle cubes" or "cake." This pelletized feed can be fed in a bunk or feed trough in a manner similar to that used for grain or other loose feeds, or it may be distributed on the ground. Because the pellets of feed are relatively large and dense compared to loose feed, they can be consumed off of the ground without an unacceptable amount of the feed being lost or trampled into the ground, especially in dry weather.

With smaller herds, pelletized feed may be distributed by hand, such as from a pail or bucket. In larger operations, feeding by hand becomes impractical and some type of mechanical feed distributor will often be employed. For example, U.S. Pat. No. 5,653,567 to Taylor discloses a mobile cattle feeder comprising a hopper with a chain type conveyor mounted at the bottom. The conveyor chains are entrained around forward and rearward sprocket drums and operate to move feed toward a discharge opening which is selectively closed by a discharge door. The rearward sprocket drum has a rotor blade mounted thereon which rotates with the rearward sprocket drum. As the rotor rotates, wheels mounted at its opposite ends periodically come into contact with a lever connected to the discharge door and thereby force the discharge door open to cyclically discharge feed.

SUMMARY OF THE INVENTION

The pelletized feed distributor of the present invention includes a hopper having an auger positioned at the bottom thereof for moving feed in the hopper toward a discharge opening. A discharge door selectively closes the discharge opening. A door opening assembly operably connected between the auger and the discharge door cyclically opens and closes the door. The door opening assembly includes a flange or radially projecting member projecting radially outward from a distal portion of the auger and a door linkage operably connected between the discharge door and the flange. The door linkage assembly urges the discharge door open as the flange rotates through a first portion of a rotational path and allows the discharge door to close as the flange rotates through a second portion of its rotational path.

In one embodiment, the door linkage assembly includes a tab having an opening therethrough connected to the discharge door, a connecting rod having a first end pivotally connected to a sprocket or flange projecting outward from the auger shaft at a pivot point radially offset from a central axis of the shaft, the connecting rod extending through the opening in the tab; and a stop formed on the connecting rod. As the auger rotates, the connecting rod cyclically moves the stop against the tab to urge the discharge door open and then away from the tab to allow the discharge door to close.

In another embodiment, a cam is mounted on and end of the auger over the door and a cam follower is connected to the end of a lift arm pivotally connected to a hopper end wall above the door with the cam follower resting on an upper portion of the periphery of the cam. A connecting rod or link is connected between the lift arm and the door. The cam has a first section of a smaller diameter and a second section of a larger diameter with sloped transition sections extending between the first and second diameter sections of the cam. As the smaller diameter section of the cam rotates under the cam follower, gravity pulls the door, the connecting rod and lift arm downward to close the opening formed in the hopper. As a first of the transition section rotates under the follower, the lift arm, connecting rod and door are raised to an open position and held in the open position as the larger diameter section of the cam rotates under the cam follower and until the second transition section is rotated under the follower.

The pelletized feed distributor may also include a discharge chute associated with the discharge opening and a chute extension pivotally connected to the discharge chute outside the discharge opening. The discharge door may also be opened by a manual door kicker connected to the chute extension.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a pelletized feed distributor according to the present invention. The feed distributor 1 is typically mounted on a truck or trailer and used to distribute pelletized cattle feed, commonly referred to as "range cubes," "cattle cubes" or "cake" to cattle. The feed distributor 1 includes a hopper 3 having at least one auger 5 longitudinally disposed proximate a bottom wall thereof for conveying feed toward a discharge opening 7 formed at a discharge end 9 of the hopper 3. A discharge door 11 selectively covers the discharge opening 7 and, when closed, acts to accumulate a quantity of feed behind the door 11. A door linkage 13 connecting the auger 5 to the discharge door 11 causes the door 11 to periodically open and allow the accumulated quantity of feed to discharge through the discharge opening 7.

The embodiment shown in the accompanying figures includes a pair of parallel augers 5a and 5b which are each rotatably mounted and driven to counter-rotate relative to each other at the same rotational speed. Each auger 5a and 5b includes a central shaft 17 and a flute 19 which wraps helically around the shaft 17. The flutes 19 of the augers 5a and 5b are wrapped in opposite radial directions about their respective shafts 17 such that both augers move feed toward the discharge opening 7 in spite of their counter-rotation. The augers 5a and 5b are timed such that the spacing between there respective flutes 19 is sufficient to minimize the possibility of feed pellets being crushed therebetween.

Figure 3:
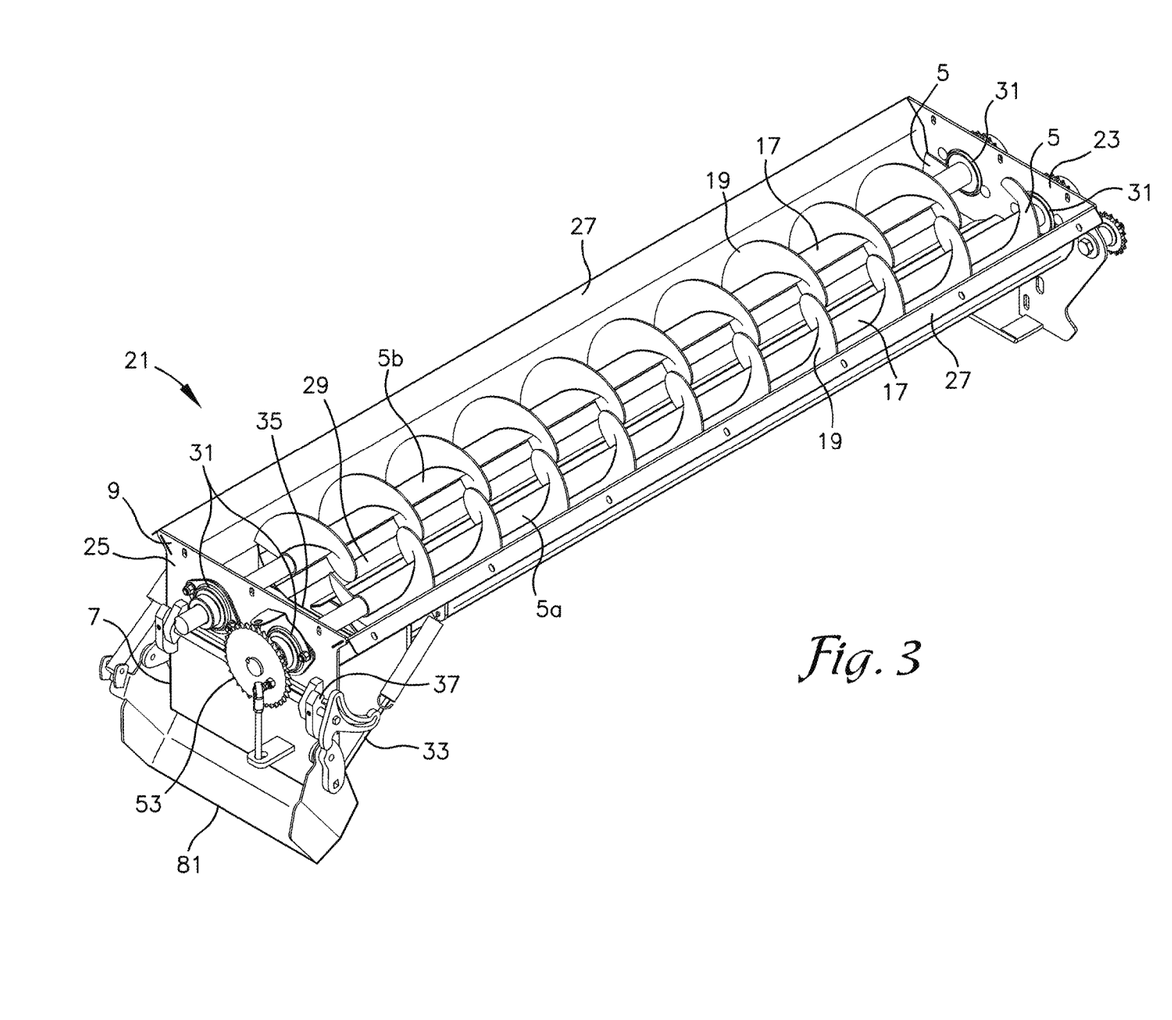
FIG. 3 is a perspective view of a trough which forms part of a modular hopper system utilized in the construction of the pelletized feed distributor, a pair of augers being visible in the trough.

As best seen in FIG. 3, the augers 5a and 5b are mounted in a trough 21 which forms the bottom portion of the hopper 3. The trough 21 may be removably connected to the remainder of the hopper 3 as part of a modular hopper system which allows a standard sized trough 21 to be used with hoppers 3 of varying capacities. The trough 21 includes forward and rearward end walls 23 and 25 respectively, sidewalls 27 and a bottom wall 29. The augers 5a and 5b each rotate on bearings 31 which are mounted in respective openings formed in the end walls 23 and 25. The bearings 31 receive the shafts 17 of the augers 5a and 5b and allow the shafts 17 to extend outwardly from the trough 21 through the bearings 31.

The discharge opening 7 is formed at a lower end of a chute 33 which feeds from an opening 35 formed in the bottom wall 29 of the trough 21 proximate the discharge end 9 of the hopper 3 and slopes downwardly and rearwardly or outwardly to the discharge opening 7. The discharge opening 7 is selectively covered by the discharge door 11 which is hingedly connected to the rearward end wall 25 of the trough 21 along its upper edge by a hinge assembly 37. The discharge door 11 is moveable between a closed position wherein it blocks the discharge opening 7 and an open position wherein the discharge opening 7 is unobstructed. The hinge assembly 37 includes a pair of first knuckles 39a secured to the rearward end wall 25 and a pair of second knuckles 39b secured to the discharge door 11. A hinge pin 41 extends generally across the width of the discharge door 11 and through aligned openings in the knuckles 39a and 39b. The hinge pin 41 is fixed to the second knuckles 39b which are mounted on the discharge door 11, such as by set screws or pins 43, and rotates freely relative to the first knuckles 39a which are mounted on the end wall 25.

Auger 5a is driven by an auger drive assembly 44 including a drive motor 45 acting through a gearbox 47. An output shaft of the gearbox 47 carries a drive sprocket 49 which is connected by a roller chain 51 to a driven sprocket 53 secured to the rearward end of the shaft 17 of auger 5a. Drive sprocket 49, roller chain 51 and driven sprocket 53 comprise additional components of the auger drive assembly. Auger 5b is driven off of auger 5a and is connected to auger 5a by an intermediate drive mechanism (not shown) which is connected between the shafts 17 of augers 5a and 5b at their forward ends. The intermediate drive mechanism imparts rotation of auger 5b which is counter to the rotation of auger 5a and may, for example, be a chain and sprocket system incorporating one or more jackshafts or a gear drive system.

The door linkage 13 includes a connecting rod 55 which connects the discharge door 11 to the driven sprocket 53. A first end of the connecting rod 55 is fitted with a heim joint 57 which rotatably receives a pin 59 secured to the driven sprocket 53 and extending outwardly therefrom in a longitudinal direction. The pin 59 is radially offset from the center of the respective shaft 17, creating a crank arm having a throw equal to the amount of offset. The connecting rod 55 extends through an opening 61 in a tab 63 secured to and extending outwardly from the discharge door 11. A stop 65 is formed at the second end of the connecting rod 55 which is larger in diameter than at least one dimension the opening 61. The connecting rod 55 may comprise a bolt 55a wherein the threaded end of the bolt 55a is screwed into an internally threaded aperture of the heim joint 57 and the head of the bolt 55a comprises the stop 65. A washer 55b encircling the bolt 55a proximate its head may also comprise part of the stop 65.

Figure 6:
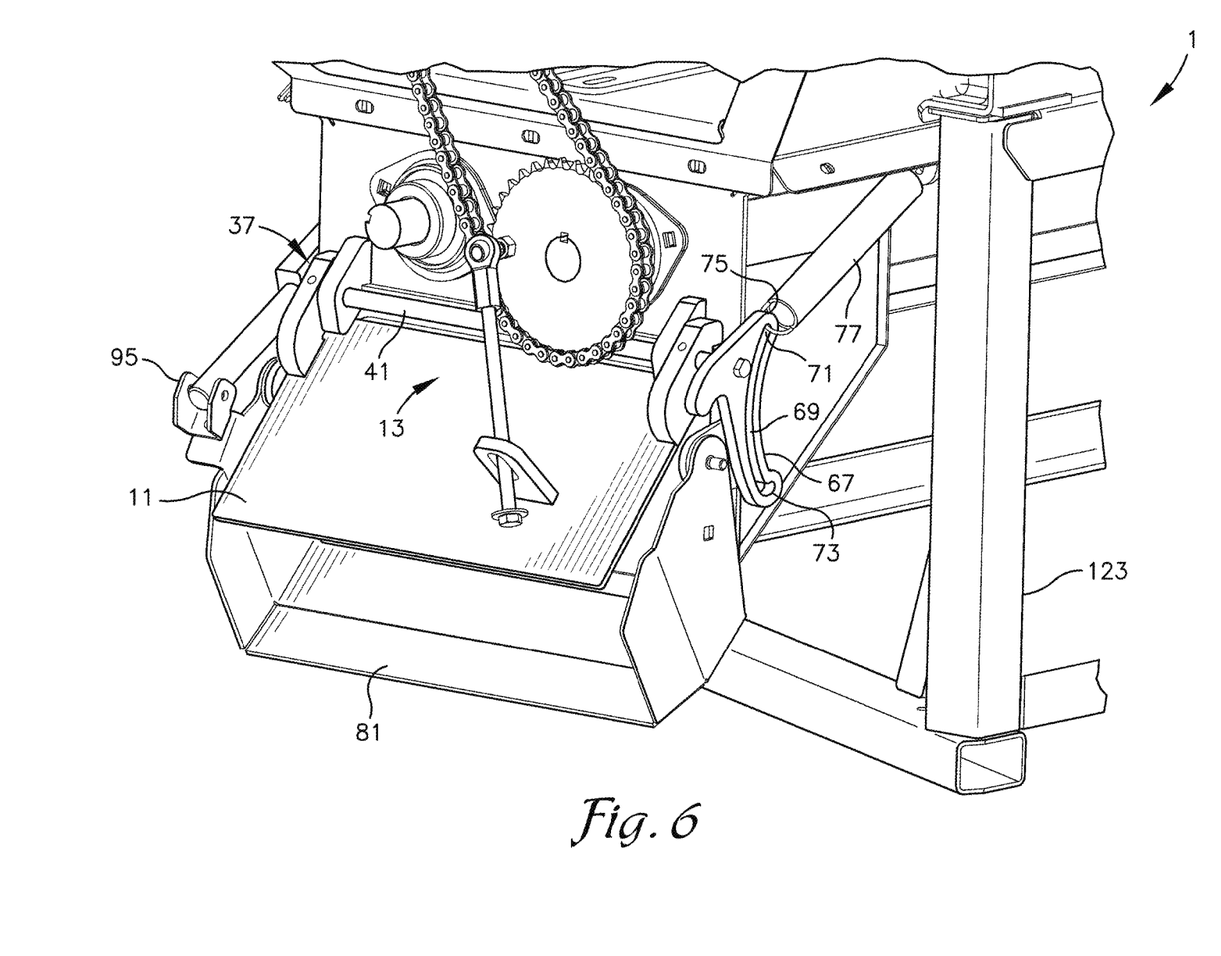
FIG. 6 is a view similar to FIG. 5 showing the discharge door held in the open position by the extension spring.
Figure 7:
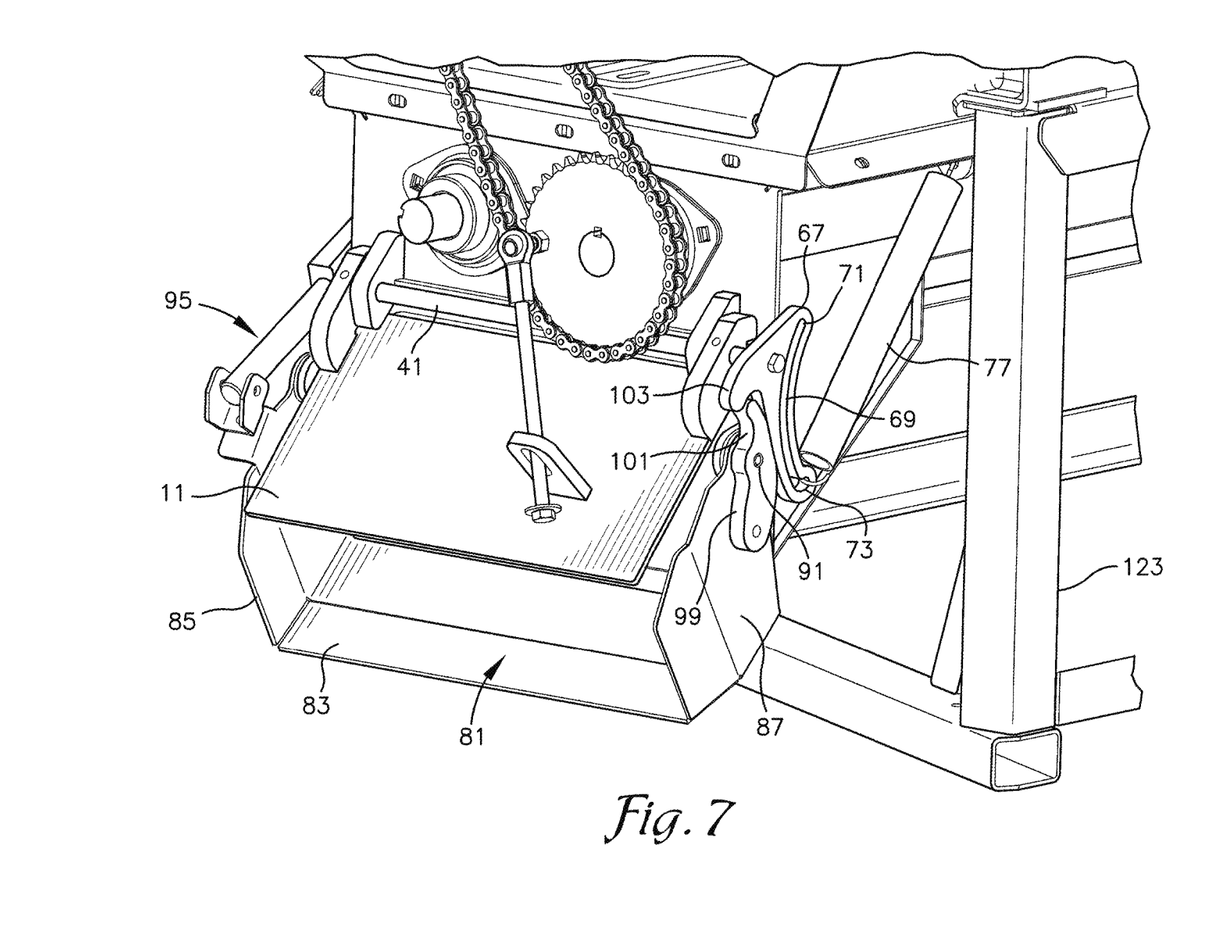
FIG. 7 is a view similar to FIG. 6 showing a manual door kicker holding the discharge door in the open position against the action of the extension spring.

Fixedly attached to an end of hinge pin 41 is a door lever 67 having an arcuate slot 69 formed therein. The slot 69 has an upper end 71 and a lower end 73. The slot 69 is curved such that the upper and lower ends 71 and 73 both extend away from the hinge pin 41 in a forward direction. The upper end 71 is spaced closer to the hinge pin 41 than the lower end 73. The slot 69 receives a first hooked end 75 of an extension spring 77. The spring 77 further includes a second hooked end 79 which is connected to the hopper 3. The position of the first end 75 of the spring 77 is selectively moveable along the slot 69 between the upper end 71 and the lower end 73. When the first end 75 of the spring 77 is positioned at the upper end 71 of the slot 69, as shown in FIG. 6, the spring 77 urges the discharge door 11 into its open position and retains it in the open position. When the first end 75 of the spring 77 is positioned at the lower end 73 of the slot 69, as shown in FIGS. 4-5 and 7, the spring 77 urges the discharge door 11 toward its closed position and will retain it in the closed position unless the force of the spring 77 is overcome.

Figure 4:
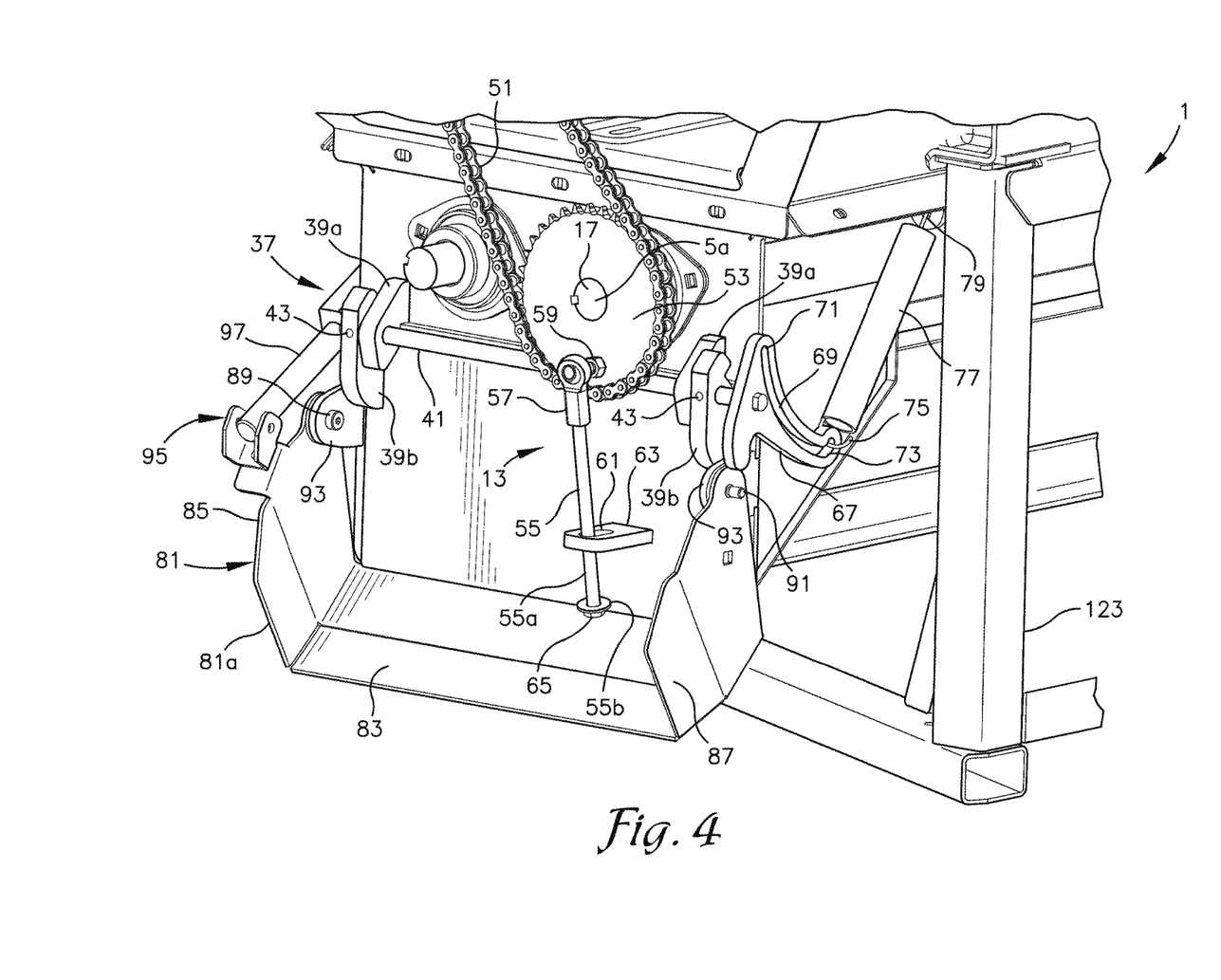
FIG. 4 is a fragmentary perspective view of the pelletized feed distributor showing a door linkage thereof, connected to an auger drive assembly, allowing a discharge door of the pelletized feed distributor to rest in a closed position under the action of an extension spring.
Figure 5:
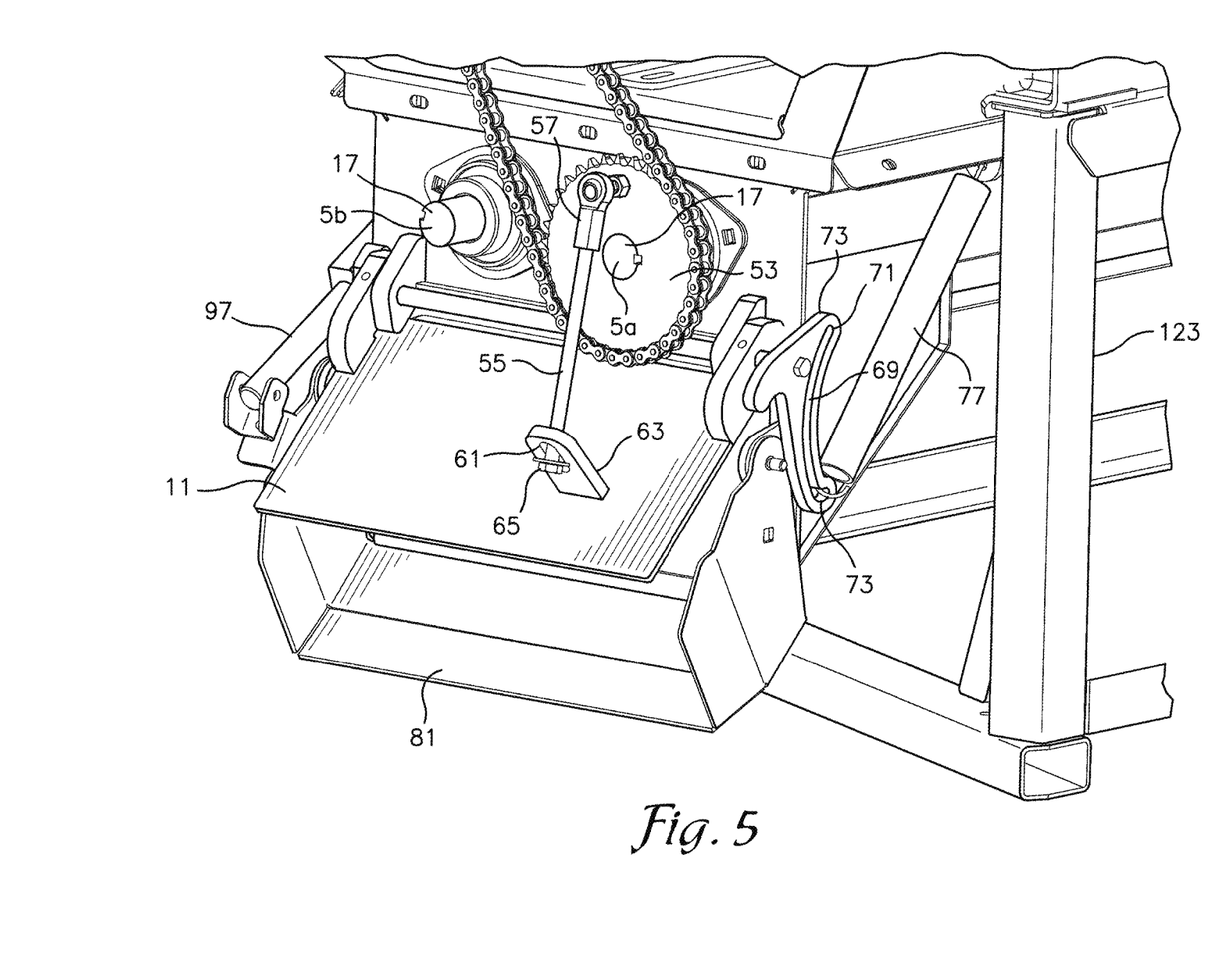
FIG. 5 is a view similar to FIG. 4 showing the door linkage after having moved the discharge door into an open position against the action of the extension spring.

Referring to FIGS. 4 and 5, a first way in which the force of the spring 77 can be overcome to open the discharge door 11 is by operation of the door linkage 13. As the feed distributor 1 is moved through a pasture with the augers 5 in operation, the sprocket 53 rotates along with auger 5*a*. As the sprocket 53 rotates, the motion is transferred to the connecting rod 55 as generally linear motion, moving the stop 65 upwardly and downwardly, with one upstroke and one downstroke of connecting rod 55 for each revolution of the sprocket 53. As the stop 65 moves upwardly, it contacts the tab 63 secured to the discharge door 11 and thereby applies an upward acting force to the discharge door 11 during a first portion of the rotational path of the sprocket 53. As the upward acting force from the door linkage 13 overcomes the force of the spring 77 the discharge door 11 will open. Continued rotation of the sprocket 53 past top dead center of the pin 59 begins the downstroke of the connecting rod 55 which gradually releases the upward acting force on the discharge door 11 and allows the discharge door 11 to close under the force of the spring 77 during a second portion of the rotational path of the sprocket 53. Once the pin 59 passes bottom dead center another upstroke of the connecting rod 55 begins.

Figure 1:
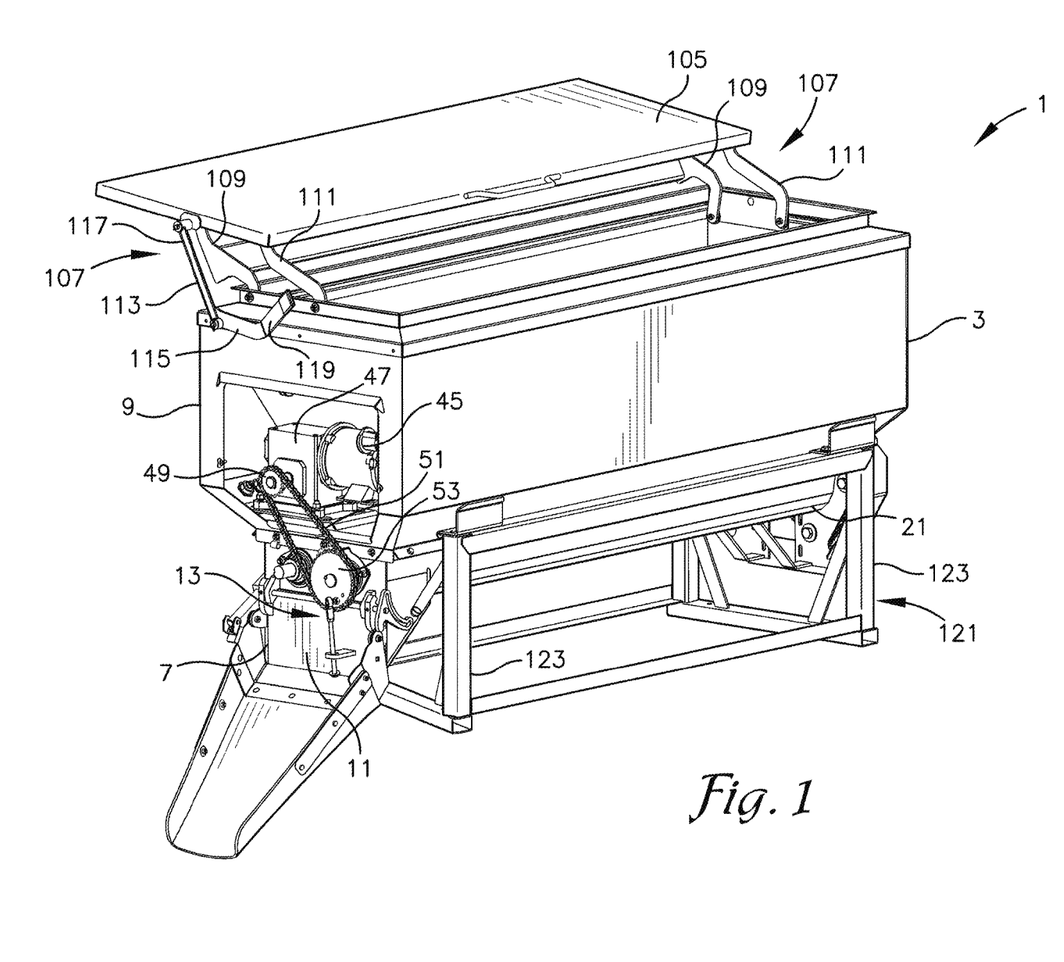
FIG. 1 is a perspective view of a pelletized feed distributor according to the present invention.
Figure 2:
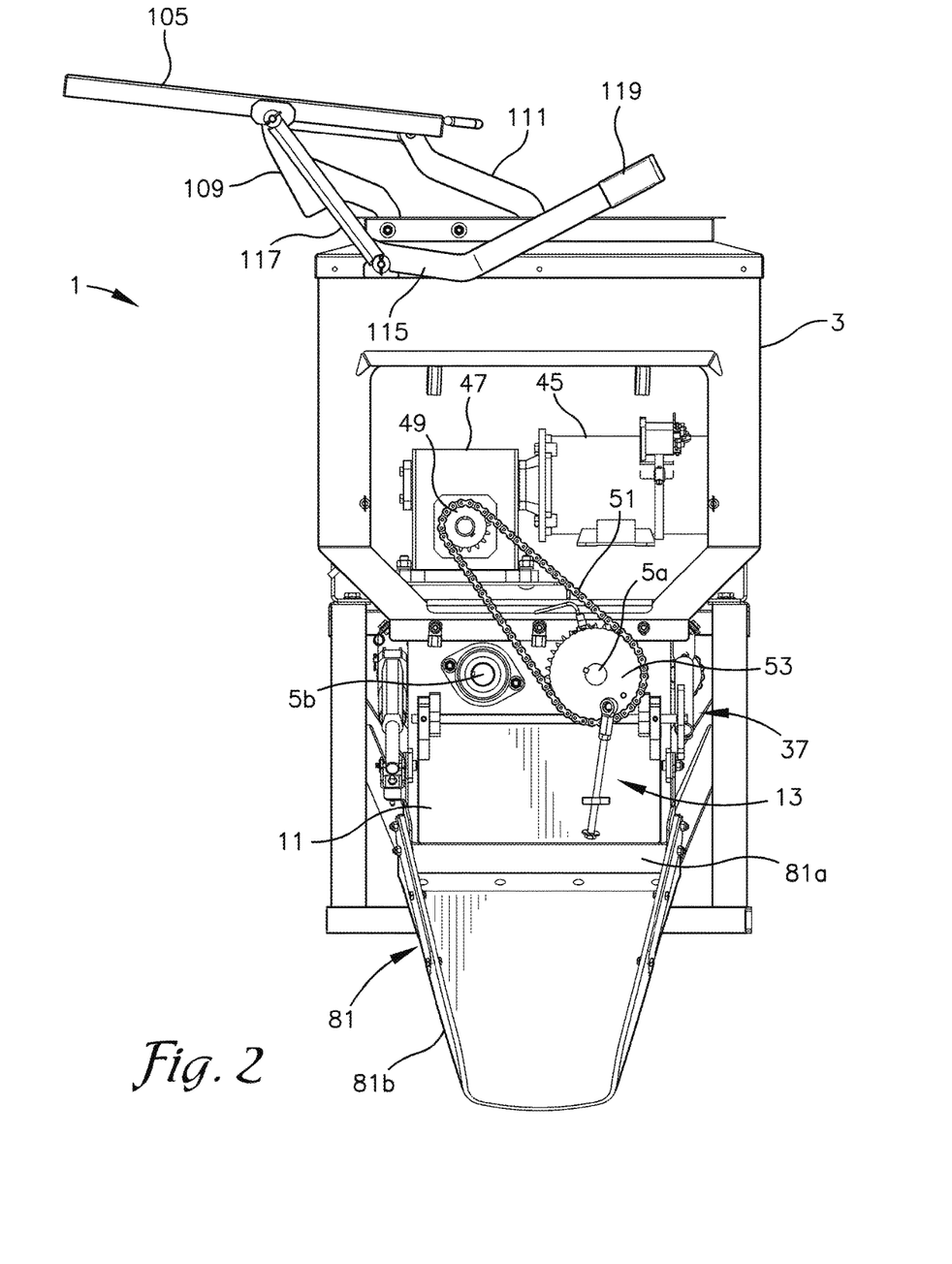
FIG. 2 is a rear elevational view of the pelletized feed distributor of FIG. 1.

The feed distributor 1 further includes a chute extension 81 which is pivotally connected to the chute 33 past the discharge opening 7 and outside of the discharge door 11. The chute extension 81 includes a bottom wall 83 and left and right upstanding side walls 85 and 87, respectively. The chute extension 81 pivots about a generally horizontal pivot axis between raised and lowered positions. The pivot axis may be defined by left and right hinge pins 89 and 91, respectively. Each of the hinge pins 89 and 91 pivotally connects the respective one of the side walls 85 and 87 of the chute extension 81 to a respective one of a pair of tabs 93 which extend rearwardly from the chute 33 on opposite sides of the discharge opening 7. Referring to FIGS. 1 and 2, the chute extension 81 may comprise proximate and distal sections 81*a* and 81*b*, respectively, removably connected to each other to form the chute extension 81. Only section 81*a* is shown in FIGS. 4-7.

The chute extension 81 may be raised and lowered remotely (such as from the operators seat of the vehicle to which it is mounted) by a chute lift mechanism 95. The mechanism 95 is shown as comprising a linear actuator 97 connected between the chute extension 81 and the hopper 3. The actuator 97 is shown as having its rod end pivotally connected to the left side wall 85 of the chute extension 81 such that retraction of the actuator rod will lift the chute extension 81 toward its raised position. The actuator 97 may be, for example, hydraulically, electrically or pneumatically operated.

As shown in FIG. 7, the chute extension 81 can be further equipped with a manual door kicker 99 which is shown as being mounted on the right hinge pin 91 and secured to the right chute side wall 87. The manual door kicker 99 includes a finger 101 positioned to engage a protrusion 103 on the door lever 67.

As discussed above, when the first end 75 of the spring 77 is positioned at the lower end 73 of the slot 69, the spring 77 urges the discharge door 11 toward its closed position. A second way that the force of the spring 77 can be overcome to open the discharge door 11 is by utilizing the chute lift mechanism 95 to lower the chute extension 81. As the chute extension 81 pivots downwardly, the finger 101 on the manual door kicker 99 engages the protrusion 103 on the door lever 67 and urges the protrusion 103 upwardly, and imparts rotation to the door lever 67. Rotation of the door lever 67 rotates the hinge pin 41 and causes the attached discharge door 11 to pivot toward its open position. The discharge door 11 will remain open until the chute lift mechanism 95 is operated to raise the chute extension 81.

It should be noted that the connecting rod 55 and the manual door kicker 99 are both easily removable so that if a user wants to use only one of the two described methods of opening the discharge door 11 he or she can do so without interference from the other system. For example, with the connecting rod 55 installed and the manual door kicker 99 removed, the door linkage 13 can be used to cyclically open and close the discharge door 11 while use of the chute lift mechanism 95 will only raise or lower the chute extension 81 without opening the discharge door 11. Similarly, with the manual door kicker 99 installed and the connecting rod 55 removed, the chute lift mechanism 95 can be used to open and close the discharge door 11 and operation of the augers 5 will not cause cyclic opening and closing of the discharge door 11. It should be noted that it is not necessary to remove the connecting rod 55 in order to utilize the door kicker 99 to open the discharge door 11 since the discharge door 11 will be held in the open position by the action of the door kicker 99 on the door lever 67 and the continued motion of the connecting rod 55 will not have any effect on the position of discharge door 11.

The hopper 3 is selectively closed at its upper end by a lid 105. The lid 105 is mounted to the hopper 3 on hinge assemblies 107, each of which includes a respective pair of parallel links 109 and 111, which allow the lid 105 to move between open and closed positions in an arcuate motion. A lid opening assembly 113 includes a lever arm 115 pivotally attached to the hopper 3 and a link 117 connected between the lever arm 115 and the lid 105. The lever arm 115 includes a handle 119. Manual operation of the handle 119 moves the lid 105 between its open and closed positions and may provide an over-centered latching function. The hopper 3 is typically supported above the mounting surface of the vehicle on a framework 121 having a plurality of legs 123.

In use, the feed distributor 1 is mounted on a vehicle, such as a truck or trailer, and a quantity of pelletized feed is placed into the hopper 3. If livestock in a pasture are to be fed on the ground, the vehicle is first driven into the pasture. A user has the option of using the feed distributor 1 to discharge either a continuous row of feed or to discharge the feed into discrete lots.

If a continuous row of feed is desired, there is a first option of placing the first end 75 of the extension spring 77 at the upper end 71 of the slot 69 such that the spring 77 urges the discharge door 11 into its open position, as shown in FIG. 6, and retains it in the open position. With the discharge door 11 open, the chute extension 81 can be lowered to discharge the feed onto the ground, the augers 5 are started, and the vehicle driven across the pasture to discharge the feed. A second option to discharge a continuous row of feed is to place the first end 75 of the extension spring 77 at the lower end 73 of the slot 69 such that the spring 77 urges the discharge door 11 toward its closed position. With the manual door kicker 99 installed, as shown in FIG. 7, the chute extension 81 can again be lowered (using the chute lift mechanism 95), however in this configuration lowering the chute extension causes the finger 101 on the manual door kicker 99 to engage the protrusion 103 on the door lever 67 and thereby cause the attached discharge door 11 to pivot into its open position. With the discharge door 11 open, the augers 5 are started, and the vehicle driven across the pasture to discharge the feed.

If discrete lots of feed are desired, the first end 75 of the extension spring 77 is placed at the lower end 73 of the slot 69, as shown in FIGS. 4 and 5, such that the spring 77 urges the discharge door 11 toward its closed position. With the manual door kicker 99 removed and the connecting rod 55 installed, the chute extension 81 can be lowered without opening the discharge door 11. This time, when the augers 5 are started, and the vehicle driven across the pasture, the action of the door linkage 13 will cause the discharge door 11 to open and close cyclically to discharge the feed in multiple spaced apart piles or discrete lots.

Referring to FIGS. 8-11, an alternative or second embodiment of the feed distributor 126 is shown. Parts of the second embodiment of the feed distributor 126 corresponding to parts of the first embodiment of the feed distributor 1 are labeled with the corresponding reference numerals. In the feed distributor 126 an alternative auger drive assembly 129 is mounted on a bracket 131 connected to and suspended below the hopper 3 proximate an end opposite the discharge door 11 and chute 33. Drive assembly 129 includes a drive motor 133 which acts through gear box 135 for driving a shaft 137 to which a drive sprocket 139 is connected. First and second driven sprockets 141 and 142 are mounted proximate the ends of shafts 17a and 17b of the augers 5a and 5b respectively at the end of the hopper opposite the discharge door 11. The ends of the shafts 17a and 17b and augers 5a and 5b to which the driven sprockets 141 and 142 are connected, in the second embodiment 126, may be referred to as the driven ends. A redirecting sprocket 144 is mounted on the driven end of shaft 17a in outwardly spaced relation to the driven sprocket 141.

A first idler sprocket 146 is supported on a shaft 147 mounted on and projecting outward from bracket 131 and in planar alignment below the first driven sprocket 141. A second idler sprocket 148 is mounted on shaft 147 in spaced relation outward from the first idler sprocket 146 and in planar alignment below the redirecting sprocket 144. A third idler sprocket 149 is mounted on a shaft 150 projecting outward from bracket 131. Third idler sprocket extends in planar alignment with redirecting sprocket 144 and on a side opposite driven sprocket 142.

First drive chain 151 extends around drive sprocket 139, first driven sprocket 141 and first idler sprocket 146. Second drive chain 152 extends across a lower peripheral edge of redirecting sprocket 144 and then upwards in opposite directions and around the driven sprocket 142 and the third idler sprocket 149 and then back downward and around the lower periphery of the second idler sprocket 148. Rotation of the drive sprocket 139 clockwise, causes the first drive chain 151 to rotate clockwise which imparts clockwise rotation on the first driven sprocket 141, redirecting sprocket 144, shaft 17a and auger 5a. Clockwise rotation of the redirecting sprocket 144 causes the second drive chain 152 to rotate counter clockwise which imparts counter clockwise rotation on the second driven sprocket 142, shaft 17b and auger 5b.

A door linkage mounting flange 153 is connected to and projects radially outward from the end of the auger shaft 17a, closest to the discharge door 11, in the second embodiment of the feed distributor 126. Similar to the first embodiment 1, the door linkage 13 of the second embodiment 126 includes a connecting rod 55 which is pivotally connected to the door linkage mounting flange 154 and operably connected to door 11 through tab 63 on the door 11 so that the connecting rod 55 slides through tab 63 through a portion of the path of rotation of flange 153. And the door linkage 13 connected to mounting flange 154 operates in the same manner as door linkage 13 connected to driven sprocket 53.

Figure 8:
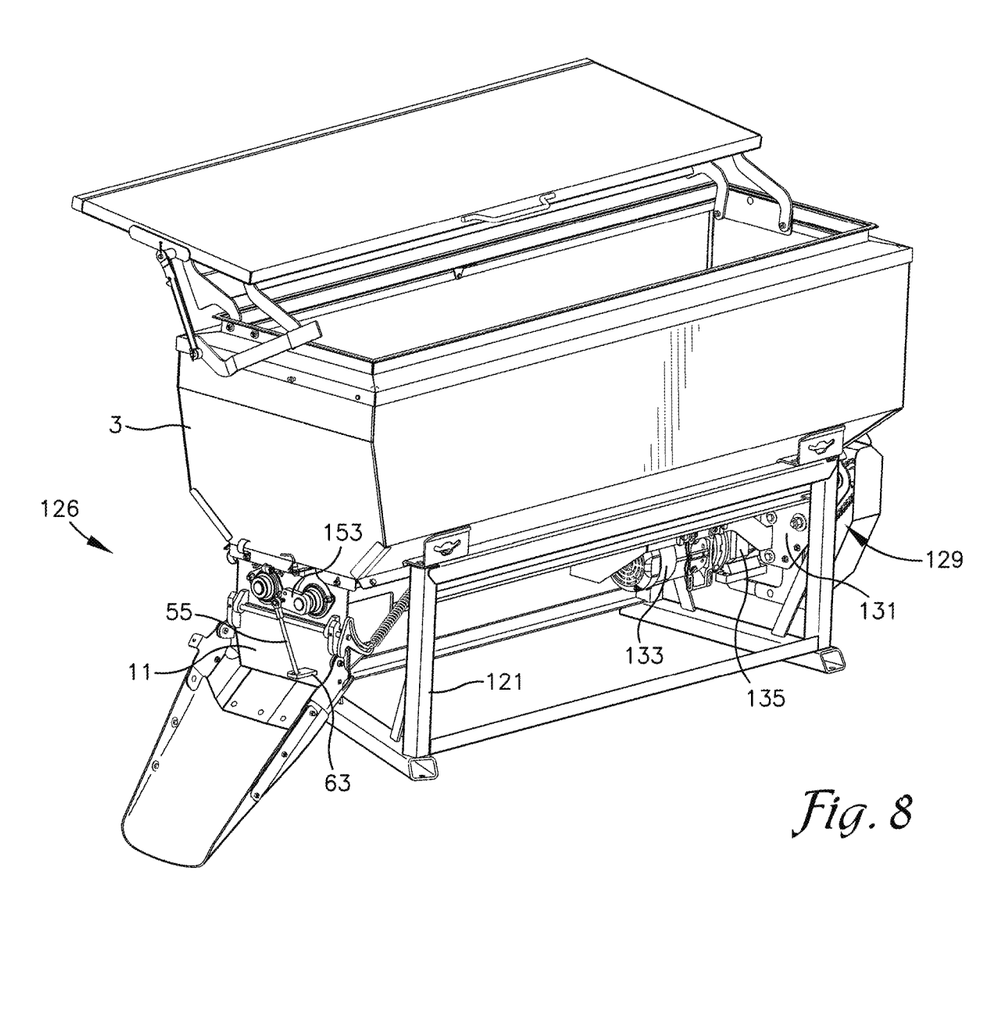
FIG. 8 is a perspective view of a second embodiment of a pelletized feed distributor in which the auger drive assembly is connected to the trough at an end of the feeder opposite the discharge door.
Figure 9:
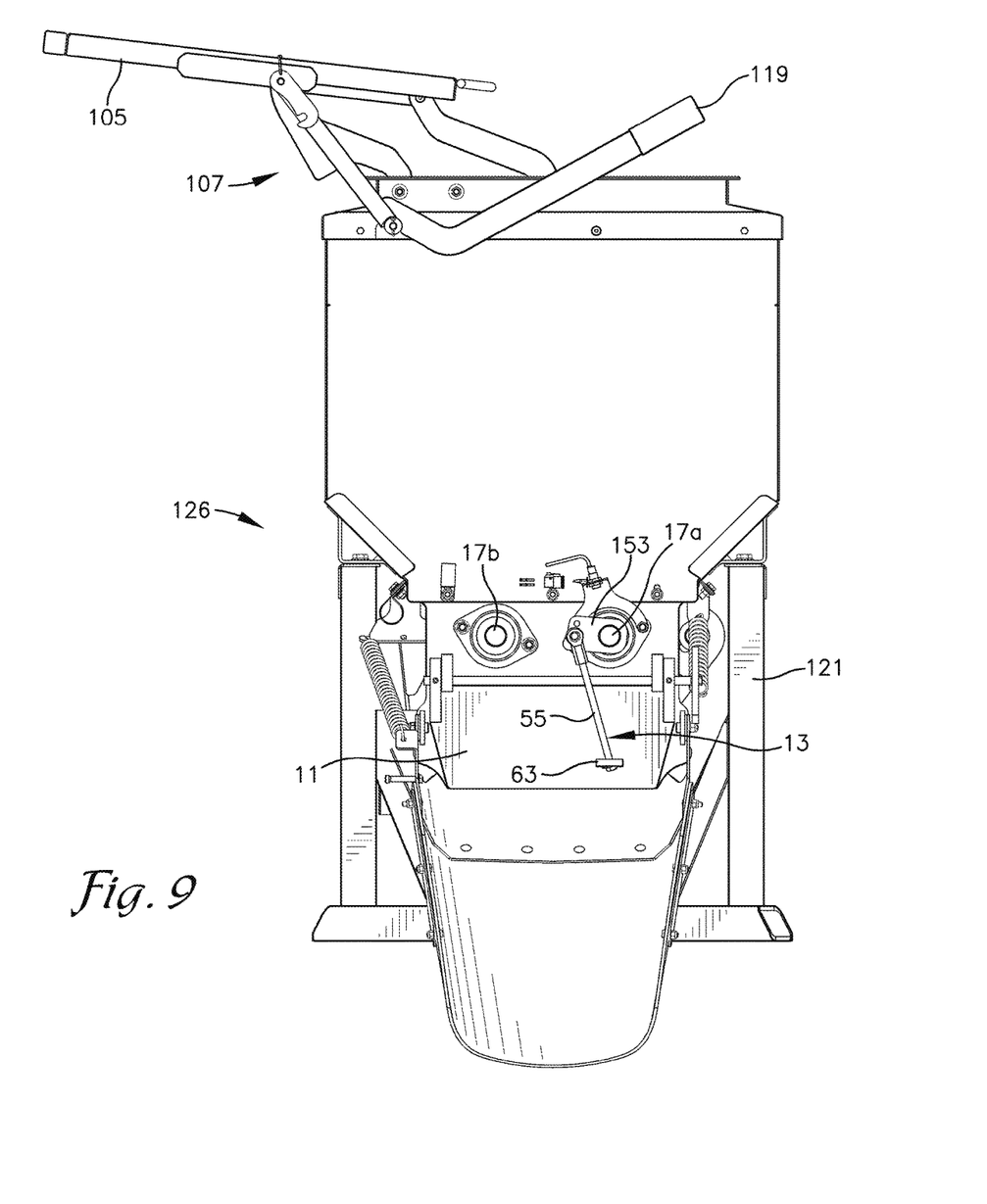
FIG. 9 is a an elevational view of an end of the pelletized feed distributor as shown in FIG. 8 including the discharge door for the hopper outlet.
Figure 10:
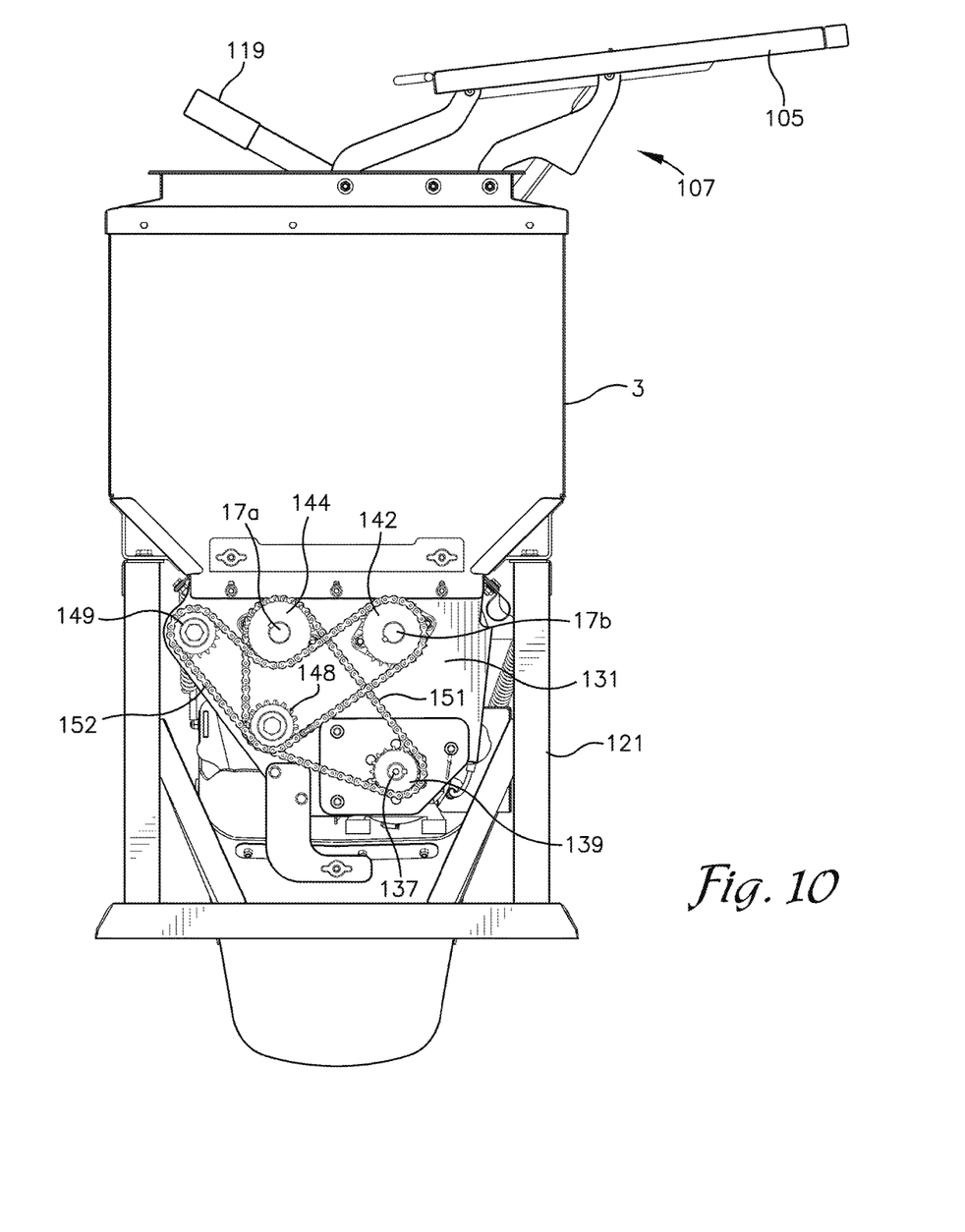
FIG. 10 is an elevational view of an end of the pelletized feed distributor as shown in FIG. 8 opposite of the discharge door for the hopper outlet.
Figure 11:
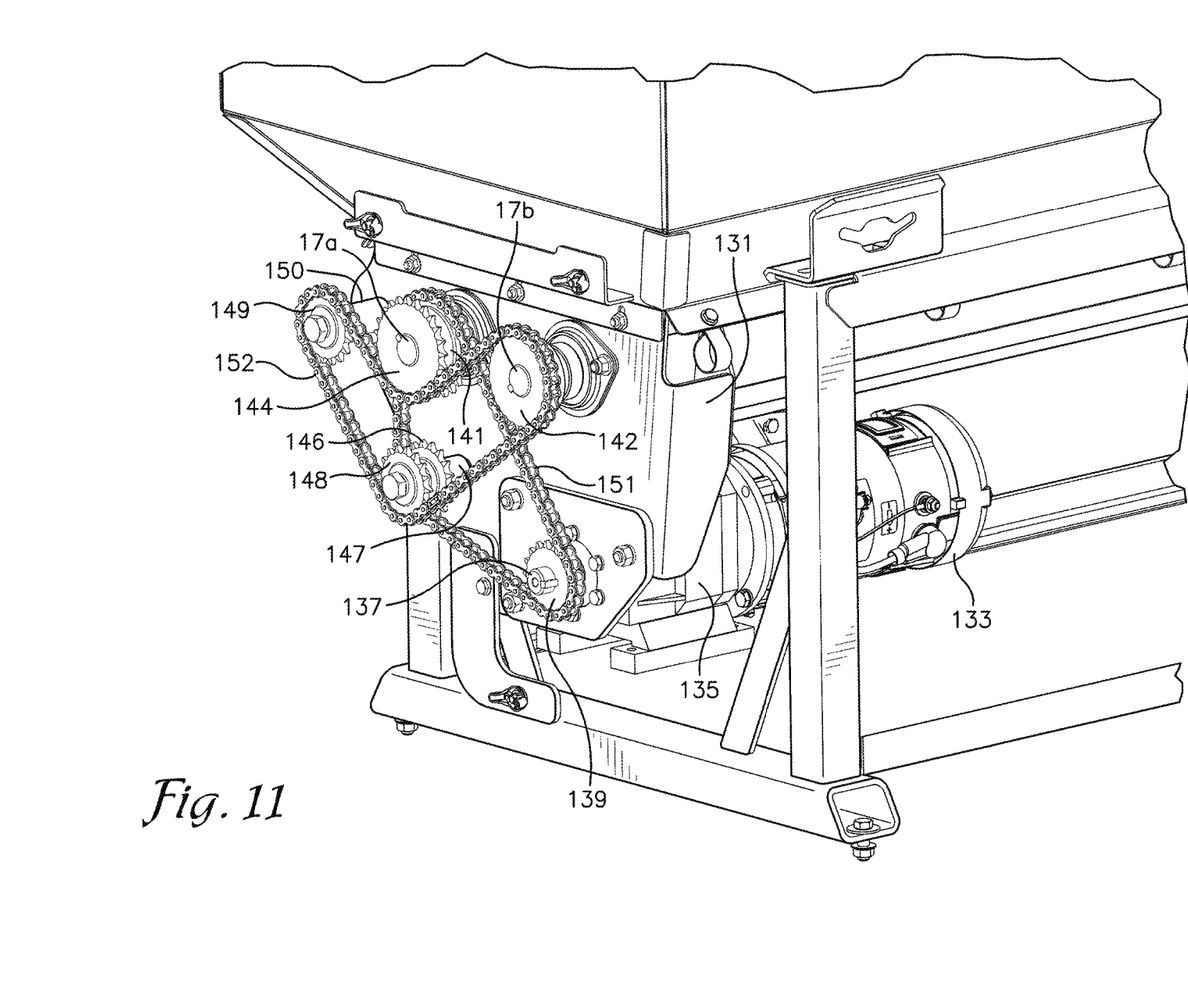
FIG. 11 is an enlarged and fragmentary, perspective view of the pelletized feed distributor of FIG. 8 looking at the end opposite the discharge door for the hopper outlet.

Because the auger drive assembly 129 of the feed distributor 126 is supported from the hopper 3 on bracket 131, load cells (not shown) can be positioned between the hopper 3 and the framework 121 supporting the hopper 3 to allow monitoring changes in weight of the hopper 3. Such changes of weight can be calibrated to determine changes in the amount of feed in the hopper 3 during use.

Figure 12:
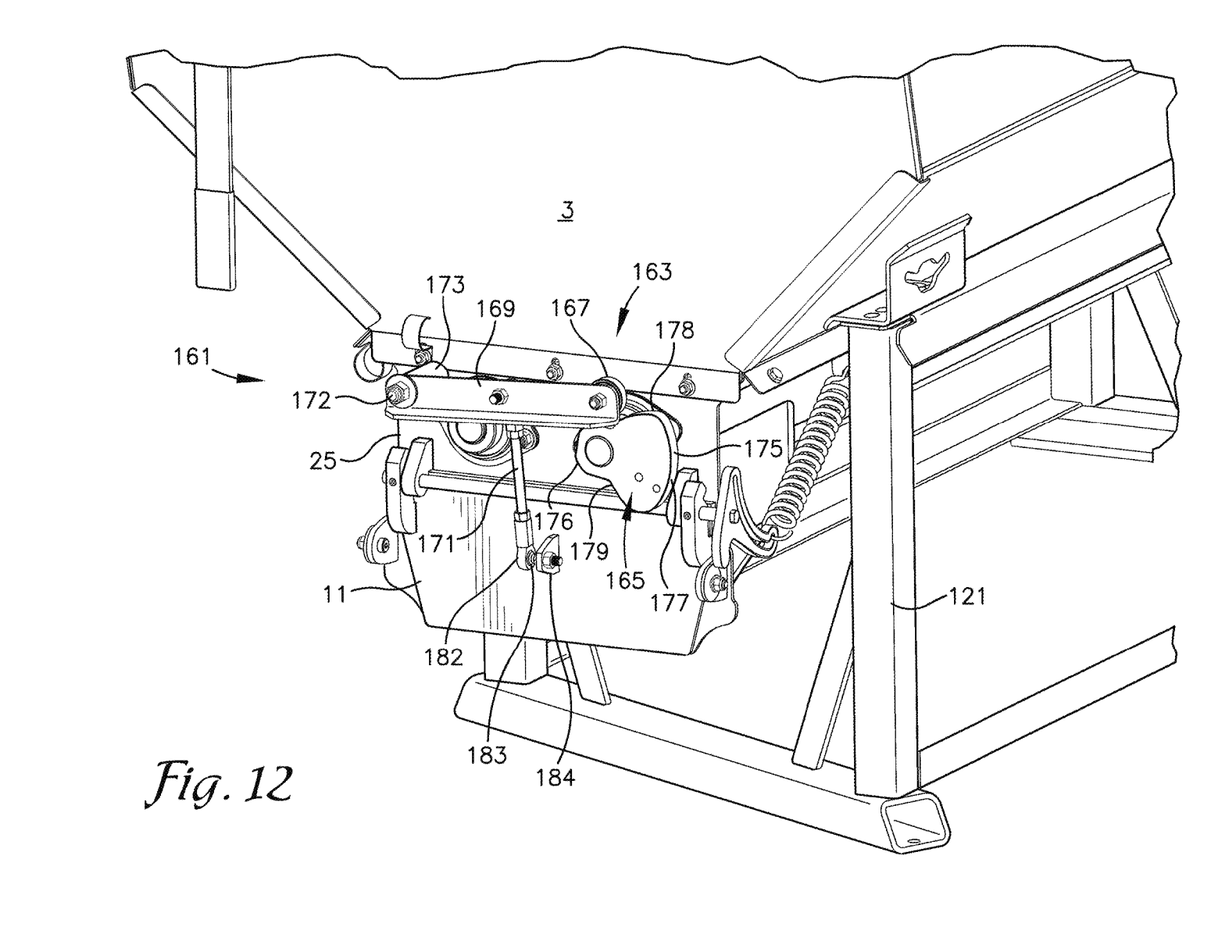
FIG. 12 is an enlarged and fragmentary perspective view of a third embodiment of the pelletized feed distributor showing an alternative door opening assembly.

Referring to FIG. 12, a third embodiment 161 of the feed distributor is shown having a modified door opening assembly 163. The door opening assembly 163 includes a cam 165 formed as a flange projecting radially outward from the end of auger shaft 17a proximate discharge door 11. Door opening assembly 163 also includes a cam follower 167 mounted on a distal end of a lift arm or pivot arm 169, pivotally connected at an opposite end to the end wall 25 of the trough 21, and a connecting rod or lift rod 171 connected between the discharge door 11 and the lift arm 169. In the embodiment shown, the lift arm 169 is pivotally mounted on a pivot pin 172 and spaced away from the end wall 25 by a spacer or bushing 173 on the pivot pin 172.

The cam 165 includes a circumferential, cam surface 175 including a first section 176 extending around approximately half of the circumference of the cam 165 or one hundred and eighty degrees of the cam 165 relative to the auger shaft 17a on which it is mounted. The first section 176 of the cam surface 175 has a first diameter or is spaced a first distance from the axis of rotation of the auger shaft 17a. The cam surface 175 includes a second section 177 extending around approximately one quarter of the circumference of the cam 165 or ninety degrees relative to the auger shaft 17a. The spacing of the second section 177 of the cam surface 175 from the axis of rotation of auger shaft 17a is greater than the spacing of the first section 176 of the cam surface 175 along the first section 175. In other words, the diameter of the cam 165 along the second section 177 is greater than the diameter of the cam along the first section 176. In the embodiment shown, the diameter along the second section 177 is at least twice and preferably approximately four times the diameter along the first section 175. In first and second transition sections 178 and 179, the outer circumference of the cam 165 or cam surface 175 slopes outward from the first section 175 to the second section 177.

The connecting rod 171 is journaled or pivotally connected at an upper end to the lift arm 169 and between the point at which the lift arm 169 is pivotally connected to the end wall 25 and the cam follower 167. The connecting rod 171 depends from the lift arm 169 and is connected at its lower end to the discharge door 11 by a heim joint 182 on rod 171 which is connected to pin 183 secured on tab 184 projecting from an outer surface of door 11.

As the first section 176 of the cam 165 or cam surface 175 rotates under the cam follower 167 (the cam 165 rotates counterclockwise in FIG. 12), the lift arm 169 and lift rod 171 are pulled downward by the weight of the door 11 which pivots to the closed position due to its weight. As the first transition section 178 rotates under the cam follower 167, the lift arm 169, lift rod 171 and door 11 are raised to open the door 11. The door remains open while the second section 177 of the cam 165 or cam surface 175 rotates under the cam follower 167 during which time feed is discharged from the hopper 3 by augers 5a and 5b. As the second transition section 179 of the cam 165 or cam surface 175 rotates under the cam follower 167, the cam follower 167, lift arm 169, lift arm 171 and door 11 are allowed to drop back down due to gravity until the door 11 covers the opening 35 in the end 25 of the trough 21. The arc length of the second section 177 of the cam surface 175 can be varied to vary the length of time the door 11 remains open. The diameter of the second section 177 or the point of connection of the lift rod 171 to the lift arm 169 can be adjusted to adjust the degree to which the door 11 pivots open.

In the embodiments disclosed herein, the cam 165 of the third embodiment, the door linkage mounting flange 153 of the second embodiment and the driven sprocket 53 of the first embodiment may be described as flanges or radially projecting members which project radially outward from the distal portion of the auger 5a. In the first and second embodiments of the feed distributor 1 and 126, the connecting rod 55 is operably connected between the sprocket 53 and discharge door 11. In the third embodiment 161, the cam follower 167, the pivot arm or lift arm 169 and the connecting rod 171 function as a door linkage assembly with the abutment of the cam follower 167 against the cam surface 175 forming an operable connection between the cam 165 and the door linkage assembly.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements, or to a pair of elements, is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A feed distributor comprising:
   a) a hopper having a bottom wall and an end wall and an interior space;
   b) a discharge opening in communication with said interior space;
   c) an auger positioned in said hopper proximate said bottom wall and extending in a longitudinal direction, said auger operable to move pelletized feed disposed in said interior space toward said discharge opening, said auger having an axis of rotation and a distal portion of said auger extending outwardly past said end wall of said hopper;
   d) a discharge door movably connected to said hopper, said discharge door selectively closing said discharge opening;
   e) a radially projecting member, projecting radially outward from the distal portion of said auger and having a cam surface formed thereon;
   f) a door linkage assembly operably connected between the discharge door and the radially projecting member; said door linkage assembly comprises a cam follower connected to a lift arm with the lift arm connected to the discharge door, the cam follower is supported on the cam surface, the cam surface having a second section which is spaced further from the axis of rotation of the auger than a first section of the cam surface such that as the first section of the cam surface rotates under the cam follower the discharge door extends in a closed position relative to the discharge opening and as the second section of the cam surface rotates under the cam follower, the door extends in an open position relative discharge opening.

2. The feed distributor as in claim 1 wherein said cam follower is mounted on the end of a pivot arm which is pivotally connected to the hopper at a pivot point and the lift arm is connected between the door and the pivot arm, the lift arm is connected to the pivot arm between the pivot point of the pivot arm and the cam follower.

3. A feed distributor comprising:
   a) a hopper having a bottom wall and an end wall and an interior space;
   b) a discharge opening in communication with said interior space;
   c) an auger positioned in said hopper proximate said bottom wall and extending in a longitudinal direction, said auger operable to move pelletized feed disposed in said interior space toward said discharge opening, said auger having an axis of rotation and a distal portion of said auger extending outwardly past said end wall of said hopper;
   d) a discharge door movably connected to said hopper, said discharge door selectively closing said discharge opening;
   e) a radially projecting member, projecting radially outward from the distal portion of said auger
   f) a door linkage assembly operably connected between the discharge door and the radially projecting member; said door linkage assembly urging said discharge door open as the radially projecting member rotates through a first portion of a rotational path and allowing said discharge door to close as the radially projecting member rotates through a second portion of the rotational path; wherein said door linkage assembly comprises:
      a tab connected to said discharge door and having an opening formed therethrough;
      a connecting rod having first and second ends, said first end pivotally connected to said radially projecting member at a pivot point radially offset from said axis of rotation of said auger, said connecting rod extending through said opening in said tab; and
      a stop on said connecting rod at a position on the opposite side of said tab from said first end of said connecting rod, said stop having a radial dimension larger than said opening in said tab; wherein
      as said auger rotates, said connecting rod cyclically moves said stop against said tab to urge said discharge door open and then away from said tab to allow said discharge door to close, with said stop extending in spaced relation away from said tab during a portion of the path of rotation of said radially projecting member during which said discharge door remains closed.

4. The feed distributor as in claim 1 wherein said discharge opening is positioned below said bottom wall of said hopper at a lower end of a discharge chute extending downwardly and outwardly from an opening in said bottom wall of said hopper proximate said end wall.

5. The feed distributor as in claim 1 wherein said auger is one of a pair of parallel augers mounted in said hopper, said augers each having a helically wound flute, said flutes wound in opposite directions from one another and said pair of augers driven to counter-rotate relative to one another.

6. A feed distributor comprising:
  a) a hopper having a bottom wall and an end wall and an interior space;
  b) a discharge opening in communication with said interior space;
  c) an auger positioned in said hopper proximate said bottom wall and extending in a longitudinal direction, said auger operable to move pelletized feed disposed in said interior space toward said discharge opening, said auger having an axis of rotation and a distal portion of said auger extending outwardly past said end wall of said hopper;
  d) a discharge door movably connected to said hopper, said discharge door selectively closing said discharge opening;
  e) a radially projecting member, projecting radially outward from the distal portion of said auger
  f) a door linkage assembly operably connected between the discharge door and the radially projecting member; said door linkage assembly urging said discharge door open as the radially projecting member rotates through a first portion of a rotational path and allowing said discharge door to close as the radially projecting member rotates through a second portion of the rotational path; and
  g) a door lever connected to said discharge door and an extension spring connected between said door lever and said hopper to urge said discharge door toward a closed orientation relative to said discharge opening.

7. The feed distributor as in claim 6 wherein said door lever is connected to a hinge pin of a hinge assembly connecting said door to said hopper.

8. A feed distributor comprising:
  a) a hopper having a bottom wall and an end wall and an interior space;
  b) a discharge opening in communication with said interior space;
  c) an auger positioned in said hopper proximate said bottom wall and extending in a longitudinal direction, said auger operable to move pelletized feed disposed in said interior space toward said discharge opening, said auger having an axis of rotation and a distal portion of said auger extending outwardly past said end wall of said hopper;
  d) a discharge door movably connected to said hopper, said discharge door selectively closing said discharge opening;
  e) a radially projecting member, projecting radially outward from the distal portion of said auger;
  f) a door linkage assembly operably connected between the discharge door and the radially projecting member; said door linkage assembly urging said discharge door open as the radially projecting member rotates through a first portion of a rotational path and allowing said discharge door to close as the radially projecting member rotates through a second portion of the rotational path; and
  g) a door lever connected to said discharge door and an extension spring connected between said door lever and said hopper; wherein said extension spring is alternatively connected to said door lever at a first connection point wherein said extension spring urges said discharge door toward an open orientation relative to said discharge opening and a second connection point wherein said extension spring urges said discharge door toward a closed orientation relative to said discharge opening.

9. The feed distributor as in claim 8 wherein said first connection point comprises a first end of an arcuate slot in said door lever and said second connection point comprises a second end of said arcuate slot opposite said first end, said extension spring slidably moveable from said first connection point to said second connection point.

10. The feed distributor as in claim 8 and further including a chute extension hingedly connected to said discharge chute below said discharge opening, said chute extension moveable between raised and lowered positions.

11. The feed distributor as in claim 10 and further including a chute lift mechanism for raising and lowering said chute extension.

12. The feed distributor as in claim 10 wherein:
  a) said door lever includes a protrusion extending outwardly therefrom; and
  b) said chute extension includes a finger positioned to engage said protrusion as said chute extension is moved from the raised position to the lowered position with said extension spring positioned at said second connection point of said door lever, engagement of said finger with said protrusion causing said door lever to move said discharge door into said open orientation relative to said discharge opening against the urging of said extension spring.

13. The feed distributor as in claim 12 wherein said finger is formed on a manual door kicker removably mounted to said chute extension.

14. A feed distributor comprising:
  a) a hopper having a bottom wall and an end wall and an interior space;
  b) a discharge opening in communication with said interior space;
  c) an auger positioned in said hopper proximate said bottom wall and extending in a longitudinal direction, said auger operable to move pelletized feed disposed in said interior space toward said discharge opening, said auger having an axis of rotation and a distal portion of said auger extending outwardly past said end wall of said hopper;
  d) a discharge door movably connected to said hopper, said discharge door selectively closing said discharge opening;
  e) a radially projecting member, projecting radially outward from the distal portion of said auger;
  f) a door linkage assembly operably connected between the discharge door and the radially projecting member; said door linkage assembly urging said discharge door open as the radially projecting member rotates through a first portion of a rotational path and allowing said discharge door to close as the radially projecting member rotates through a second portion of the rotational path;
  g) wherein said discharge door is connected to said hopper by a hinge assembly, said hinge assembly including:
    a) at least one first knuckle secured to said hopper;

b) at least one second knuckle secured to said discharge door;

c) a hinge pin extending through aligned openings in said first and second knuckles, said hinge pin fixed to said at least one second knuckle and rotatable relative to said at least one first knuckle; and d) a door lever fixedly secured to said hinge pin.

15. The feed distributor as in claim 14 and further including an extension spring connected between said door lever and said hopper.

16. The feed distributor as in claim 15 wherein said extension spring is alternatively connected to said door lever at a first connection point wherein said extension spring urges said discharge door toward an open orientation relative to said discharge opening and a second connection point wherein said extension spring urges said discharge door toward a closed orientation relative to said discharge opening.

17. The feed distributor as in claim 16 wherein said first connection point comprises a first end of an arcuate slot in said door lever and said second connection point comprises a second end of said arcuate slot opposite said first end, said extension spring slidably moveable from said first connection point to said second connection point.

18. The feed distributor as in claim 16 and further including a chute extension hingedly connected to said discharge chute below said discharge opening, said chute extension moveable between raised and lowered positions.

19. The feed distributor as in claim 18 and further including a chute lift mechanism for raising and lowering said chute extension.

20. The feed distributor as in claim 18 wherein:
a) said door lever includes a protrusion extending outwardly therefrom; and
b) said chute extension includes a finger positioned to engage said protrusion as said chute extension is moved from the raised position to the lowered position with said extension spring positioned at said second connection point of said door lever, engagement of said finger with said protrusion causing said door lever to move said discharge door into said open orientation relative to said discharge opening against the urging of said extension spring.

21. The feed distributor as in claim 20 wherein said finger is formed on a manual door kicker removably mounted to said chute extension.

22. A feed distributor comprising:
a) a hopper having a bottom wall and an end wall;
b) a discharge chute extending from an opening in said bottom wall of said hopper proximate said end wall to a discharge opening below said bottom wall;
c) an auger positioned in said hopper proximate said bottom wall and extending in a longitudinal direction normal to said end wall, said auger operable to move pelletized feed disposed in said hopper toward said discharge chute;
d) a discharge door movably connected to said hopper, said discharge door selectively closing said discharge opening;

e) a door lever secured to said discharge door and an extension spring connected between said door lever and said hopper, said extension spring alternatively connected to said door lever at a first connection point wherein said extension spring urges said discharge door toward an open orientation relative to said discharge opening and a second connection point wherein said extension spring urges said discharge door toward a closed orientation relative to said discharge opening, said door lever having a protrusion extending outwardly therefrom; and f) a chute extension hingedly connected to said discharge chute below said discharge opening, said chute extension moveable between raised and lowered positions; wherein g) said chute extension includes a finger positioned to engage said protrusion on said door lever as said chute extension is moved from the raised position to the lowered position with said extension spring positioned at said second connection point of said door lever, engagement of said finger with said protrusion causing said door lever to move said discharge door into said open orientation relative to said discharge opening against the urging of said extension spring.

23. The feed distributor as in claim 22 wherein said finger is formed on a manual door kicker removably mounted to said chute extension.

24. The feed distributor as in claim 22 wherein said first connection point comprises a first end of an arcuate slot in said door lever and said second connection point comprises a second end of said arcuate slot opposite said first end, said extension spring slidably moveable from said first connection point to said second connection point.

25. The feed distributor as in claim 22 and further including a chute lift mechanism for raising and lowering said chute extension.

26. The feed distributor as in claim 22 wherein:
a distal portion of said auger extends outwardly past said end wall of said hopper and said auger includes an axis of rotation; and
the feed distributor further comprises:
a radially projecting member, projecting radially outward from the distal portion of said auger; and
a door linkage assembly operably connected between the discharge door and the radially projecting member; said door linkage assembly urging said discharge door open as the radially projecting member rotates through a first portion of a rotational path and allowing said discharge door to close as the radially projecting member rotates through a second portion of the rotational path.

27. The feed distributor as in claim 22 wherein said auger is one of a pair of parallel augers mounted in said hopper, said augers each having a helically wound flute, said flutes wound in opposite directions from one another and said pair of augers driven to counter-rotate relative to one another.

* * * * *